(12) United States Patent
Takahashi

(10) Patent No.: US 8,531,498 B2
(45) Date of Patent: Sep. 10, 2013

(54) SUPPORT STRUCTURE AND IMAGE FORMING APPARATUS

(75) Inventor: Hiroki Takahashi, Osaka (JP)

(73) Assignee: Kyocera Mita Corporation (JP)

( * ) Notice: Subject to any disclaimer, the term of this patent is extended or adjusted under 35 U.S.C. 154(b) by 194 days.

(21) Appl. No.: 13/111,323

(22) Filed: May 19, 2011

(65) Prior Publication Data

US 2011/0292151 A1 Dec. 1, 2011

(30) Foreign Application Priority Data

May 28, 2010 (JP) ................................ 2010-123209

(51) Int. Cl.
*B41J 27/00* (2006.01)
*B41J 15/14* (2006.01)
*B41J 2/435* (2006.01)
*G03G 15/00* (2006.01)

(52) U.S. Cl.
USPC ........... 347/257; 347/242; 347/245; 347/263; 399/118

(58) Field of Classification Search
USPC .................. 347/242, 245, 257, 263; 399/118
See application file for complete search history.

(56) References Cited

U.S. PATENT DOCUMENTS

| | | | | |
|---|---|---|---|---|
| 5,212,520 A | * | 5/1993 | Toyofuku | 399/107 |
| 5,475,484 A | * | 12/1995 | Kimura | 399/130 |
| 6,278,471 B1 | * | 8/2001 | Uchiyama et al. | 347/138 |
| 6,483,527 B2 | * | 11/2002 | Kaneko et al. | 347/138 |
| 7,844,196 B2 | * | 11/2010 | Kita et al. | 399/107 |
| 8,170,444 B2 | * | 5/2012 | Kanno et al. | 399/111 |
| 2011/0242265 A1 | * | 10/2011 | Takahashi et al. | 347/263 |
| 2012/0189341 A1 | * | 7/2012 | Takahashi | 399/92 |

FOREIGN PATENT DOCUMENTS

| | | | | |
|---|---|---|---|---|
| JP | 1-93697 | | | 6/1989 |
| JP | 11125789 | A | * | 5/1999 |
| JP | 2000131635 | A | * | 5/2000 |
| JP | 2003205649 | A | * | 7/2003 |
| JP | 2004029294 | A | * | 1/2004 |
| JP | 2006208789 | A | * | 8/2006 |
| JP | 2007320224 | A | * | 12/2007 |
| JP | 2010039155 | A | * | 2/2010 |

* cited by examiner

*Primary Examiner* — Laura Martin
*Assistant Examiner* — Jeremy Bishop
(74) *Attorney, Agent, or Firm* — Gerald E. Hespos; Michael J. Porco; Matthew T. Hespos

(57) ABSTRACT

A support structure, which includes: a housing configured to store an optical element; a support unit configured to support the housing; a positioning element configured to position the housing with respect to the support unit; a vibration-proof element configured to prevent transmission of vibration from the support unit to the housing; and an extension from the housing toward the support unit. The support unit includes a first surface configured to define an opening into which the extension is inserted. The positioning element supports and positions the extension in the opening so that the extension portion is apart from the first surface. The vibration-proof element is disposed between the first surface and the extension portion.

5 Claims, 11 Drawing Sheets

SUPPORT STRUCTURE AND IMAGE FORMING APPARATUS

BACKGROUND OF THE INVENTION

1. Field of the Invention

The present invention relates to a support structure configured to support a housing, and an image forming apparatus with the support structure.

2. Description of the Related Art

Optical elements are used in various technical fields. Image forming apparatuses (for example, copy machines, printers, fax machines and combined machines with the functions of the abovementioned devices) utilize optical elements configured to form an electrostatic latent image on a photoreceptor drum. An optical system used in the image forming apparatus is typically stored in a housing of an exposure device.

The image forming apparatus comprises a number of dynamic mechanical elements. For example, the photoreceptor drum mentioned above, a developing device configured to supply toner to the photoreceptor drum, and a conveyor configured to convey a sheet are used as the dynamic mechanical elements. The motions of these mechanical elements potentially cause vibration, which is transmitted to a housing or the other mechanical elements of the image forming apparatus.

Optical facilities utilizing optical elements such as the aforementioned exposure device are more sensitive to the vibration. For example, vibration transmitted to the exposure device through the housing of the image forming apparatus, which supports the exposure device, causes, for example, a jitter image (an image with unintentional streaks).

Support structures configured to proof transmission of such vibration to the optical facilities have been developed. A well-known support structure has, for example, a plate configured to support an optical reader and a vibration-proof spring configured to support the plate, as shown in Japanese Unexamined Utility Model Publication No. 1-93697.

The aforementioned plate is positioned with respect to a chassis by a positioning boss attached to the chassis and a vibration-proof rubber inserted through an opening defined in the plate. It is preferred that a harder vibration-proof rubber be used for the purpose of more accurate positioning. However, the harder vibration-proof rubber usually has worse vibration-proof performance, whereas use of a lower hardness of the vibration-proof rubber for the purpose of better vibration-proof performance results in less accurate positioning of the plate with respect to the chassis.

SUMMARY OF THE INVENTION

An object of the present invention is to provide a support structure configured to achieve a balance between a vibration-proof function and a positioning function, as well as an image forming apparatus using the support structure.

A support structure for supporting a housing configured to store an optical unit according to one aspect of the present invention includes: a support unit configured to support the housing; a positioning element configured to position the housing with respect to the support unit; a vibration-proof element configured to proof transmission of vibration from the support unit to the housing; and an extension portion extending from the housing toward the support unit, wherein the support unit includes a first surface configured to define an opening into which the extension portion is inserted, the positioning element supports and positions the extension portion in the opening so that the extension portion is apart from the first surface, and the vibration-proof element is disposed between the first surface and the extension portion.

An image forming apparatus for forming an image using toner according to another aspect of the present invention includes: an exposure device for radiating a laser beam; an image bearer for carrying an electrostatic latent image formed by the laser beam from the exposure device; a developing device for supplying the toner to the image bearer so as to develop a toner image; and a support unit for supporting the exposure device, wherein the exposure device includes: a housing for storing an optical element for defining an optical path of the laser beam; a positioning element for positioning the housing in relation to the support unit; vibration-proof element for preventing transmission of a vibration from the support unit to the housing; and an extension portion that extends from the housing toward the support unit, the support unit includes a first surface that forms an opening to which the extension portion is inserted, the positioning element positions the extensions portion in the opening while supporting the extension portion in such a manner that the extension portion is separated from the first surface, and the vibration-proof element is disposed between the first surface and the extension portion.

DETAILED DESCRIPTION OF THE PREFERRED EMBODIMENTS

A support structure and an image forming apparatus according to one embodiment are now described hereinafter with reference to the accompanying drawings. It should be noted that the purpose of directional terms such as "upper," "lower," "left" and "right" used hereinafter is to merely clarify the descriptions and not to limit principles of the support structure and the image forming apparatus in any way.

(Image Forming Apparatus)

Figure 1:
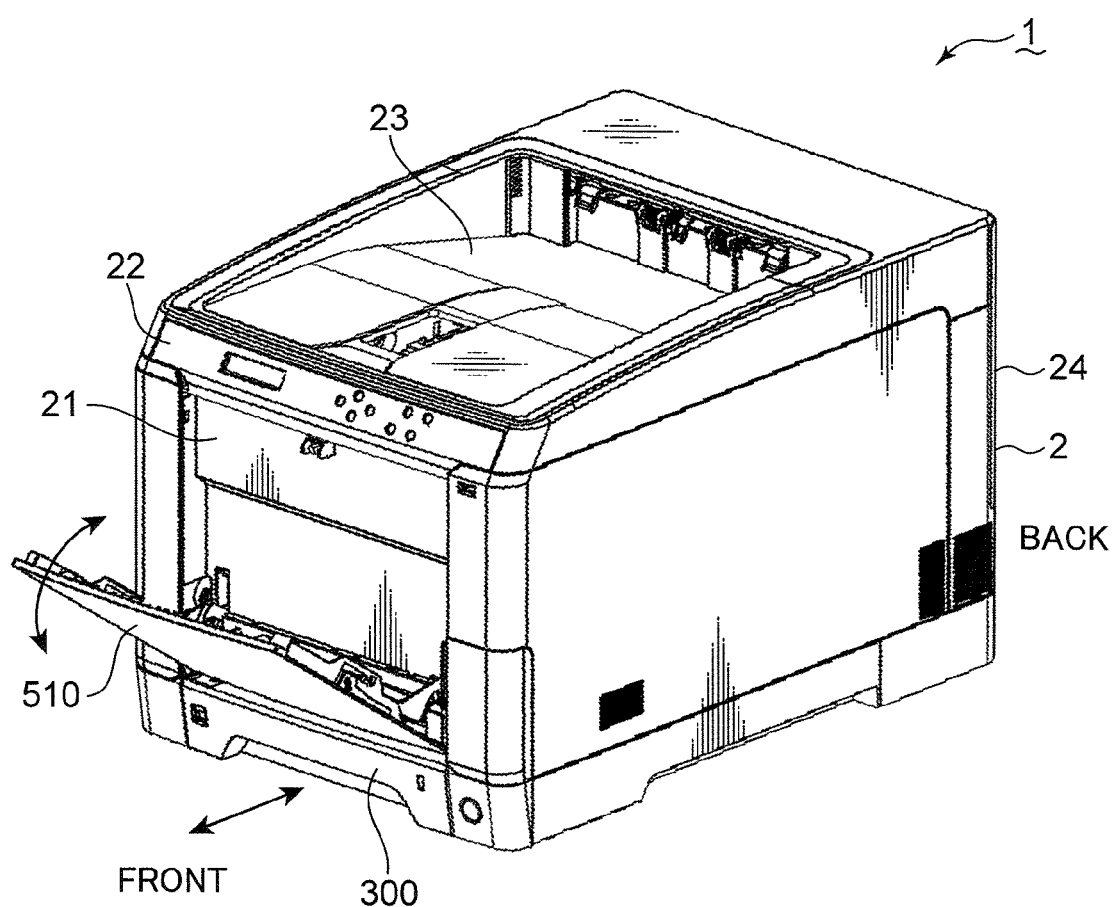
FIG. 1 is a schematic perspective view of an image forming apparatus according to one embodiment.

FIG. 1 is a perspective view of an image forming apparatus according to one embodiment. The image forming apparatus shown in FIG. 1 is a printer. A copy machine, a fax machine, a combined machine having the functions of these devices or any other device configured to form an image on a sheet may be alternatively used as the image forming apparatus.

An image forming apparatus 1 comprises a substantially rectangular boxed main housing 2, a tray 510 projecting toward the front side of the main housing 2, and a cassette 300 disposed below the tray 510. The main housing 2 stores various devices required for forming an image on a sheet (e.g., elements constituting an image forming portion, described hereinafter). The tray 510 attached to the main housing 2 is configured to pivot about a lower edge of the tray 510. The tray 510 shown in FIG. 1 is located in a projection position where the tray 510 projects from the main housing 2. A user may place sheets on the tray 510 located in the projection position. A feed assembly described hereinafter supplies the sheet on the tray 510 toward the image forming portion to form an image on the sheet. When the user rotates and moves the tray 510 closer to the main housing 2 from the projection position, the tray 510 is stored in a recessed region 21 formed in the main housing 2. The cassette 300 is detachable from the main housing 2. An upward opening is defined in the cassette 300. A user may draw the cassette 300 from the main housing 2 toward the front thereof to store sheets in the cassette 300 through the opening. After storing the desired sheets in the cassette 300, the user may insert the cassette 300 back into the main housing 2.

The image forming apparatus 1 also comprises an operation panel 22 above the tray 510. A user may operate the operation panel 22 to cause the image forming apparatus 1 to perform desired operation. The operation panel 22 may include a button for adjusting, for example, color density of a toner image. The image forming apparatus 1 forms the toner image on a sheet in response to an input from the user operating the operation panel 22 and an image signal (a signal including information on the image to be printed out) sent from an external device (e.g., a personal computer).

The image forming portion forms a toner image on a sheet fed from the tray 510 or the cassette 300. The sheet is then discharged onto a catch tray 23 formed on an upper surface of the main housing 2. A space defined on the catch tray 23 is substantially tapered so that the sheets subjected to an image forming process are accumulated.

Figure 2:
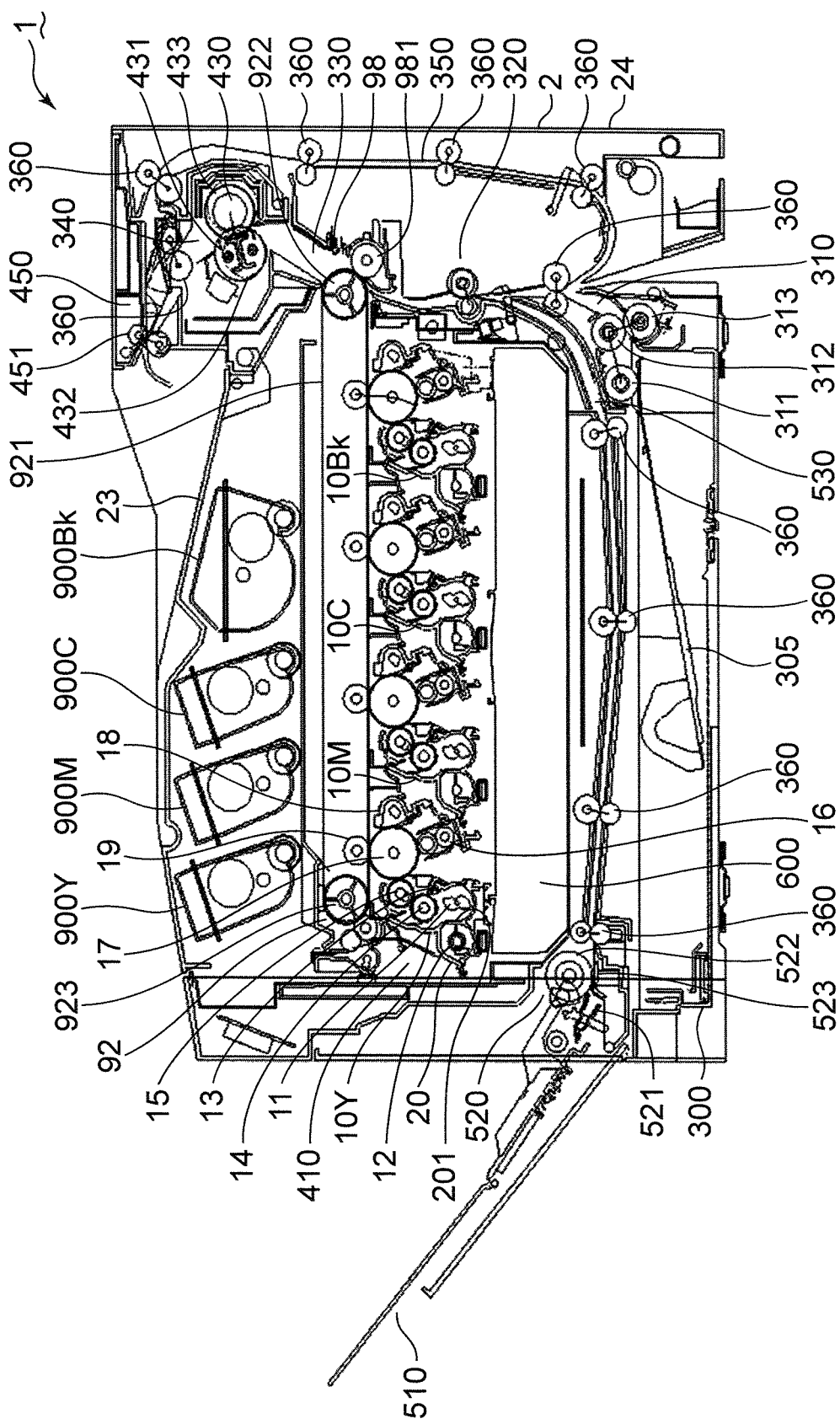
FIG. 2 is a schematic view showing an internal structure of the image forming apparatus shown in FIG. 1.

FIG. 2 schematically shows an internal structure of the image forming apparatus 1. The image forming apparatus 1 is described in further detail with reference to FIGS. 1 and 2.

A sheet conveyed from the tray 510 or the cassette 300 is guided by a conveyance path defined in the main housing 2, and conveyed to the image forming portion 410 configured to form a toner image on a sheet and a fixing portion 430 configured to fix the toner image onto the sheet. Subsequently, the sheet is discharged onto the catch tray 23 through a discharge portion 450.

The conveyance path includes a first feed path 530 extending from the feed assembly 520, which is configured to feed a sheet to the image forming portion 410, toward a back wall 24 of the main housing 2, and a second feed path 310 extending upward from a downstream end of the cassette 300 (a right end in FIG. 2), which is located under the first feed path 530. The feed assembly 520 draws a sheet on the tray 510 into the main housing 2. The first feed path 530 merges with the second feed path 310 before a resist roller pair 320 configured to send a sheet to the image forming portion 410 in synchronization with an image forming process performed by the image forming portion 410.

The conveyance path further includes a main conveyance path 330 configured to guide a sheet from the resist roller pair 320 to the fixing portion 430, and a discharge path 340 configured to guide the sheet from the fixing portion 430 to the discharge portion 450. The image forming portion 410 forms a toner image on a sheet moving along the main conveyance path 330. Subsequently, the fixing portion 430 fixes the toner image on the sheet. If a user causes the image forming apparatus 1 to perform one-side printing, the discharge portion 450 discharges the sheet, which has been sent from the fixing portion 430 to the discharge path 340, to the outside of the main housing 2. The discharged sheet is stacked on the catch tray 23.

If a user causes the image forming apparatus 1 to perform double-side printing, the discharge portion 450 carries out switchback operation in which the discharge portion 450 sends a certain length of the sheet, which has been conveyed to the discharge path 340 from the fixing portion 430, to the outside of the main housing 2, and then pulls the sheet back into the main housing 2. The conveyance path further includes a return path 350 configured to guide the sheet pulled back by the discharge portion 450. The return path 350 extends from the discharge portion 450 toward the back wall 24 of the main housing 2 and further extends downward. The return path 350 further extends toward the second feed path 310 and finally merges with the second feed path 310.

The first feed path 530, the second feed path 310, the main conveyance path 330, the discharge path 340 and the return path 350 are provided in position with conveyance roller pairs 360 configured to convey a sheet guided by these conveyance paths.

As described above, a sheet on the tray 510 is sent to the first feed path 530 by the feed assembly 520. The feed assembly 520 includes a lift board 521 configured to push up a leading edge of the sheet on the tray 510 tilted down toward the main housing 2, a feed roller 522 disposed to come into contact with the leading edge of the sheet pushed up by the lift board 521, and a separation pad 523 disposed below the feed roller 522. When the feed roller 522 rotates, the sheet passes in between the feed roller 522 and the separation pad 523 and is sent into the first feed path 530. The separation pad 523 applies a frictional force to the sheet passing in between the feed roller 522 and the separation pad 523. Therefore, when the feed roller 522 sends several sheets to the first feed path 530, the separation pad 523 applies a frictional force to the sheets other than the top sheet (the sheet in direct contact with the feed roller 522), and prevents these sheets from being conveyed into the first feed path 530 by using the frictional force acting in a direction opposite to a conveyance direction. As a result, the sheets are sent, one by one, into the first feed path 530.

The cassette 300, which is the other sheet feeding source, includes a lift board 305 configured to support sheets stored in the cassette 300. The lift board 305 is tilted to push a leading edge of the sheet in the cassette 300 upward (toward the opening of the cassette 300 and/or a pickup roller 311 described hereinafter). The pickup roller 311 is disposed above a downstream end of the lift board 305. The pickup roller 311 comes into contact with the leading edge of the sheet pushed up by the lift board 305. As a result, the sheet is sent from the cassette 300 to the downstream by the rotation of the pickup roller 311.

A feed roller 312 and a retard roller 313 below the feed roller 312 are disposed after the pickup roller 311. The pickup roller 311 sends the sheet in between the feed roller 312 and the retard roller 313. The feed roller 312 rotates to further send the sheet to the downstream. A torque limiter controls rotation of the retard roller 313. When the pickup roller 311 sends two or more sheets in between the feed roller 312 and the retard roller 313, the torque limiter at work stops the rotation of the retard roller 313. As a result, the retard roller 313 applies a frictional force to the sheets other than the top sheet (the sheet in direct contact with the feed roller 312), so that the frictional force acts against conveyance of the sheets. When the pickup roller 311 sends one sheet in between the feed roller 312 and the retard roller 313, the torque limiter is not activated, so that the retard roller 313 rotates according to the conveyance of the sheet. As a result, the sheets are sent, one by one, to the second feed path 310.

The sheet conveyed to the second feed path 310 is sent toward the resist roller pair 320 by the conveyance roller pair 360 provided in the second feed path 310. The aforementioned return path 350 merges with the second feed path 310 before the conveyance roller pair 360. Therefore, the second feed path 310 and the conveyance roller pair 360 similarly send a sheet, which has been fed to the second feed path 310 via the return path 350, to the resist roller pair 320. The first feed path 530 merges with the second feed path 310 before the resist roller pair 320. Therefore, the resist roller pair 320 feeds the sheet, which has been conveyed via the first feed path 530 or the second feed path 310, to the image forming portion 410.

The image forming portion 410 includes a yellow toner container 900Y, a magenta toner container 900M, a cyan toner container 900C, and a black toner container 900Bk. Developing devices 10Y, 10M, 10C and 10Bk corresponding to toner colors Y, M, C and Bk are disposed below these containers. The image forming portion 410 forms an image on a sheet by using toner stored in these toner containers 900Y, 900M, 900C and 900Bk.

The image forming portion 410 includes photoreceptor drums (photoreceptors on which latent images are formed by an electrophotographic system), which are used as image bearers configured to bear toner images. A photoreceptor drum using an amorphous silicon (a-Si)-base material is used as each photoreceptor drum 17. Yellow toner, magenta toner, cyan toner and black toner are supplied from the toner containers 900Y, 900M, 900C and 900Bk to the photoreceptor drums 17 corresponding to the toner colors Y, M, C and Bk, respectively.

A charger 16, the corresponding developing device 10Y, 10M, 10C or 10Bk, a transfer device 19, and a cleaning device 18 are arranged around each photoreceptor drum 17. The charger 16 evenly charges a surface of the corresponding photoreceptor drum 17. The charged circumferential surface of the photoreceptor drum 17 is exposed to a laser beam emitted from an exposure device 600. As a result, an electrostatic latent is formed on the circumferential surface of the photoreceptor drum 17. The exposure device 600 emits the laser beam to the charged circumferential surface of the photoreceptor drum 17 based on the image signal (a signal including image information) sent from the external device. The circumferential surface of the photoreceptor drum 17 bearing the electrostatic latent image then moves to the corresponding developing device 10Y, 10M, 10C or 10Bk. The developing devices 10Y, 10M, 10C and 10Bk supply the photoreceptor drums 17 with the toner from the toner containers 900Y, 900M, 900C and 900Bk, respectively, to form toner images which coincide with the electrostatic latent images formed on the photoreceptor drums 17, respectively. The transfer device 19 and the corresponding photoreceptor drum 17 hold an intermediate transfer belt 921 therebetween to form a nip. The toner image on the corresponding photoreceptor drums 17 is primarily transferred onto the intermediate transfer belt 921 at the nip. The cleaning device 18 cleans the circumferential surface of the photoreceptor drum 17 after the corresponding toner image is transferred therefrom.

The developing devices 10Y, 10M, 10C and 10Bk include developing housings 20, respectively. Two-component developer with magnetic carrier and toner is accommodated in the developing housing 20. Each of the developing devices 10Y, 10M, 10C and 10Bk also includes two stirring rollers 11, 12 near a bottom of the developing housing 20. The stirring rollers 11, 12 arranged in substantially parallel with each other rotate in the developing housing 20.

Each of the developing devices 10Y, 10M, 10C and 10Bk includes a partition 201 standing upright from the bottom of the corresponding developing housing 20. The partition 201 defines a circulation passage along which the developer circulates. The circulation passage is formed around the partition 201. The stirring rollers 11, 12 disposed in the circulation passage stir and convey the two-component developer along the circulation passage.

While the two-component developer is circulated in the developing housing 20 by the stirring rollers 11 and 12, the toner is charged. The two-component developer on the stirring roller 11 is attracted by a magnetic roller 14 above the stirring roller 11. The attracted two-component developer forms magnetic brush (not shown) on the magnetic roller 14. A layer of the magnetic brush is regulated in thickness by a doctor blade 13. A toner layer on a developing roller 15 is formed by a difference in potential between the magnetic roller 14 and the developing roller 15. The electrostatic latent image on each photoreceptor drum 17 is developed into the corresponding toner image.

The exposure device 600 includes various optical devices such as a light source, polygon mirror, reflecting mirror and polarizing mirror. The exposure device 600 emits light based on the image signal, to the circumferential surface of the photoreceptor drum 17 provided in the image forming portion 410, so as to form the electrostatic latent image.

An intermediate transfer unit 92 includes the intermediate transfer belt 921, a drive roller 922 and an idler 923. The toner images from the photoreceptor drums 17 are applied in a superimposed manner (primary transfer) onto the intermediate transfer belt 921. The superimposed toner images are secondarily transferred to a sheet, which has been supplied from the cassette 300 or the tray 510, by a secondary transfer portion 98. The secondary transfer portion 98 includes the drive roller 922, the intermediate transfer belt 921 wrapped around the drive roller 922, and a transfer roller 981 configured to press the intermediate transfer belt 921. The drive roller 922 and the idler 923 which drive and rotate the intermediate transfer belt 921 are rotatably supported by the main housing 2.

A sheet sent from the resist roller pair 320 is fed in between the intermediate transfer belt 921 and the transfer roller 981 of the secondary transfer portion 98. A toner image on the intermediate transfer belt 921 is transferred to the sheet passing between the intermediate transfer belt 921 and the transfer roller 981. The sheet is then sent to the fixing portion 430 while carrying the toner images transferred thereto by the secondary transferred part 98.

The fixing portion 430 includes a heating roller 432 having a built-in heater 431, and a pressure roller 433 configured to press the heating roller 432. The sheet sent from the secondary transfer portion 98 is conveyed in between the heating roller 432 and the pressure roller 433. The toner on the sheet are melted by heat energy of the heating roller 432 and pressurized by the pressure roller 433, and thereby fixed onto the sheet. The fixing portion 430 sends the sheet, on which the toner has been fixed, to the discharge portion 450 via the discharge path 340.

The discharge portion 450 includes a discharge roller pair 451. The discharge roller pair 451 is configured to bi-directionally rotate. The switchback operation described earlier is accomplished by the bi-directional rotation of the discharge roller pair 451.

(Exposure Device)

Figure 3:
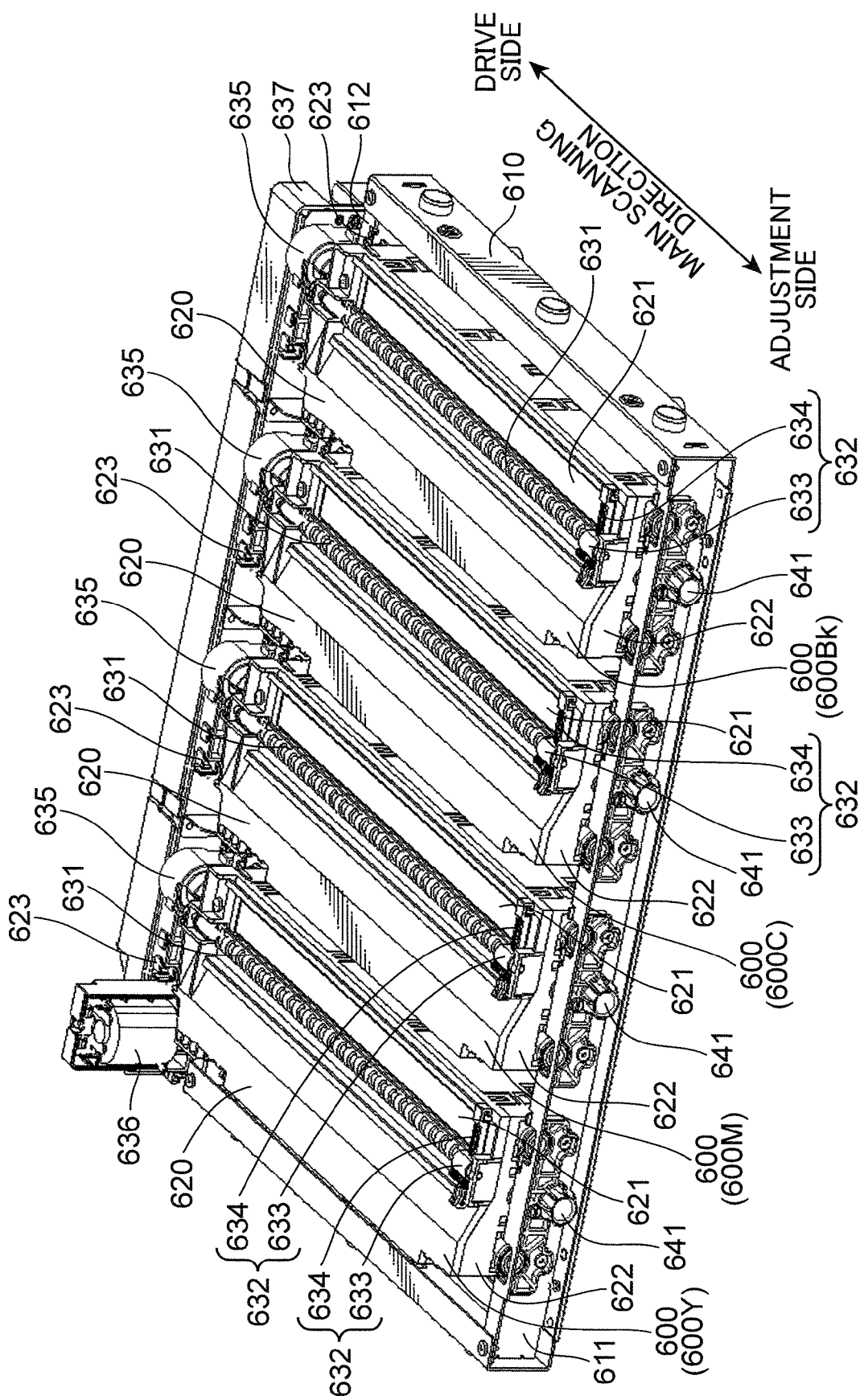
FIG. 3 is a schematic perspective view of four exposure devices which are incorporated in the image forming apparatus shown in FIG. 1.

FIG. 3 is a perspective view of the exposure device 600 and a frame configured to support the exposure device 600. The exposure device 600 and the frame are described using FIGS. 1 to 3.

A frame 610, which has a substantially rectangular contour, is used as a support unit configured to support four exposure devices 600. The frame 610 is attached to an inner wall surface of the main housing 2 of the image forming apparatus 1. The exposure device 600Y, which is disposed on the far left of FIG. 3, emits a laser beam to the photoreceptor drum 17 on which a yellow toner image is formed. The exposure device 600M on the right side of the exposure device 600Y emits a laser beam to the photoreceptor drum 17 on which a magenta toner image is formed. The exposure device 600C on the right side of the exposure device 600M emits a laser beam to the photoreceptor drum 17 on which a cyan toner image is formed. An exposure device 600Bk disposed on the far right of FIG. 3 emits a laser beam to the photoreceptor 17 on which a black toner image is formed.

Each exposure device 600 includes a substantially rectangular boxed housing 620. A light source configured to produce a laser beam and optical elements configured to define an optical path and guide the laser beam emitted from the light source to the corresponding photoreceptor drum 17 are stored in the housing 620 supported by the frame 610.

The housing 620 includes a substantially rectangular window 621 made of dust-proof glass. The window 621 formed along a right edge on an upper surface of the housing 620 extends in a main scanning direction of the exposure device 600. The laser beam emitted from the light source disposed in the housing 620 is transmitted through the window 621 and radiated on the circumferential surface of the corresponding photoreceptor 17.

The exposure device 600 includes a screw shaft 631 extending along a left edge of the window 621, and a cleaning portion 632 connected to the screw shaft 631. The cleaning portion 632 includes a ring 633 attached to the screw shaft 631, and a wiper 634 extending from the ring 633 and coming into contact with the window 621. The ring 633 reciprocates in the main scanning direction in accordance with rotation of the screw shaft 631. Thus, the window 621 is appropriately cleaned by the wiper 634.

The frame 610 includes a first support portion 611 configured to support the sequentially arranged four exposure devices 600, and a second support portion 612 opposite to the first support portion 611 so that the second support portion 612 extends in substantially parallel with the first support portion 611. The housing 620 includes a first wall 622 formed along the first support portion 611, and a second wall 623 opposite to the first wall 622. The second support portion 612 is formed along the second wall 623. The first support portion 611 is provided with an adjustment hole 641 for adjusting angular settings of the optical elements stored in the housing 620. A user may insert a dedicated tool into the adjustment hole 641 to change the angular settings of the optical elements. Therefore, the side on which the first support portion 611 is disposed is called "adjustment side." A drive housing 637, which partially stores a drive mechanism 635 configured to drive the screw shaft 631, is attached to an outer surface of the second support portion 612. The drive mechanism 635 configured to drive the screw shaft 631 is partially exposed between the drive housing 637 and the second wall 623. Therefore, the side on which the second support portion 612 is disposed is called "drive side." A drive source 636 configured to drive the drive mechanism 635 is attached to a corner of the frame 610.

Figure 4:
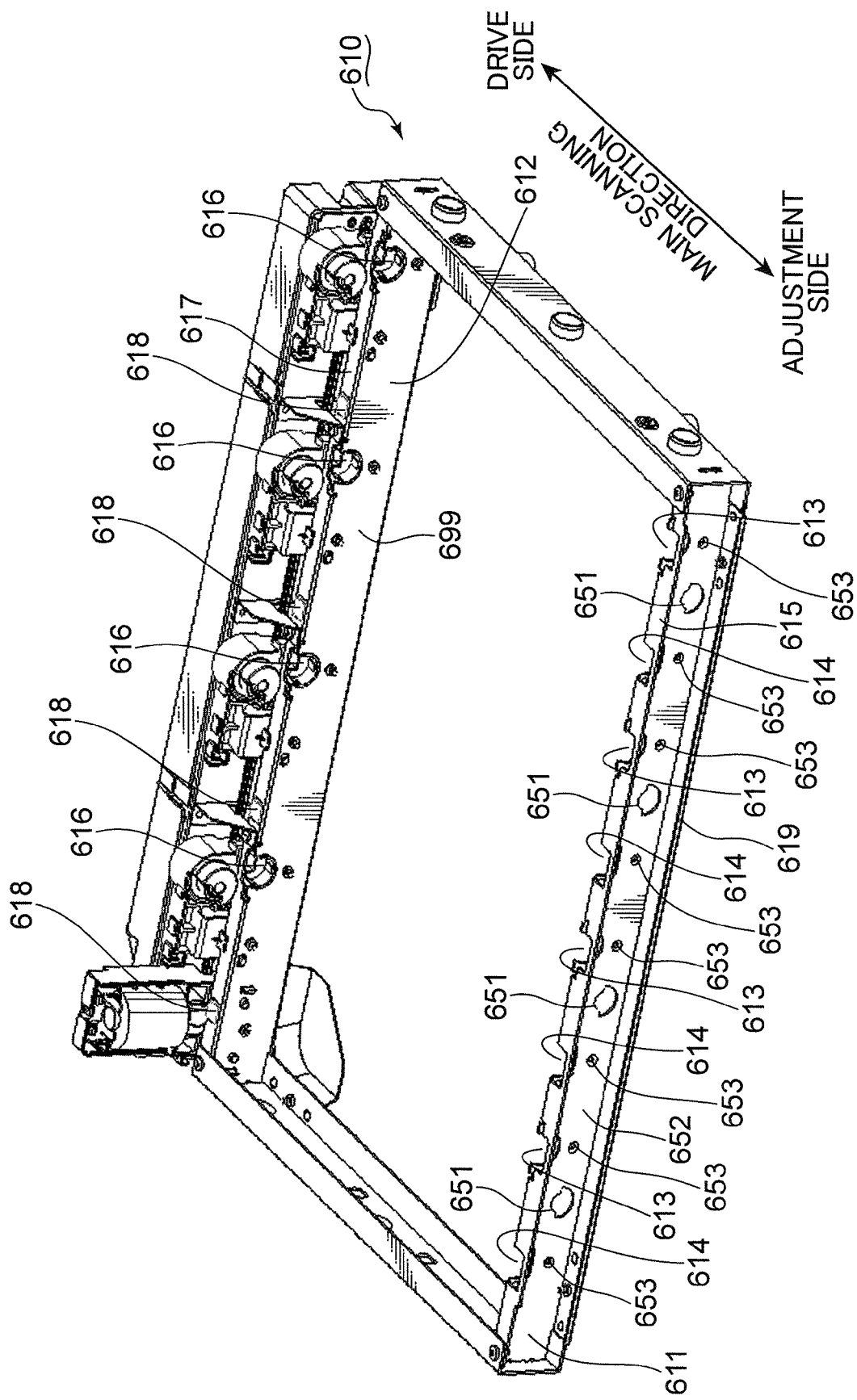
FIG. 4 is a schematic perspective view of a frame configured to support the four exposure devices shown in FIG. 3.

FIG. 4 is a perspective view showing appearance of the frame 610. The frame 610 is described using FIGS. 3 and 4.

The first support portion 611 of the frame 610, which is a beam member with a substantially U-shaped cross section, has a first upper edge surface 615, a lower edge surface 619 below the first upper edge surface 615, and a main board 652 between the first upper edge surface 615 and the lower edge surface 619. First and second notches 613, 614 are alternately recessed in the first support portion 611. The first and second notches 613, 614 are recessed over the main board 652 from the first upper edge surface 615. In the first upper edge surface 615, the first and second notches 613, 614 are profiled from an inner edge of the first upper edge surface 615 toward the adjustment side. In addition, in the main board 652, the first and second notches 613, 614 are profiled downward.

Third notches 616 are recessed in the second support portion 612 of the frame 610. The third notches 616 define a substantially U-shaped opening cut in a second upper edge surface 617, respectively. The third notch 616 profiles a substantially arc concave space on a second main board 699 of the second support portion 612, which supports the second upper edge surface 617. The third notches 616 confront the first notches 613, respectively. Thus, the exposure devices 600 may be placed from above into the frame 610 by means of the first, second and third notches 613, 614 and 616.

An absorber 618 is attached on the second upper edge surface 617 of the second support portion 612. The absorber 618 absorbs vibration transmitted to the frame 610. The absorber 618, therefore, prevents the vibration from being transmitted to each exposure device 600. The absorber 618 is placed to substantially confront the corresponding second notch 614.

Figure 5:
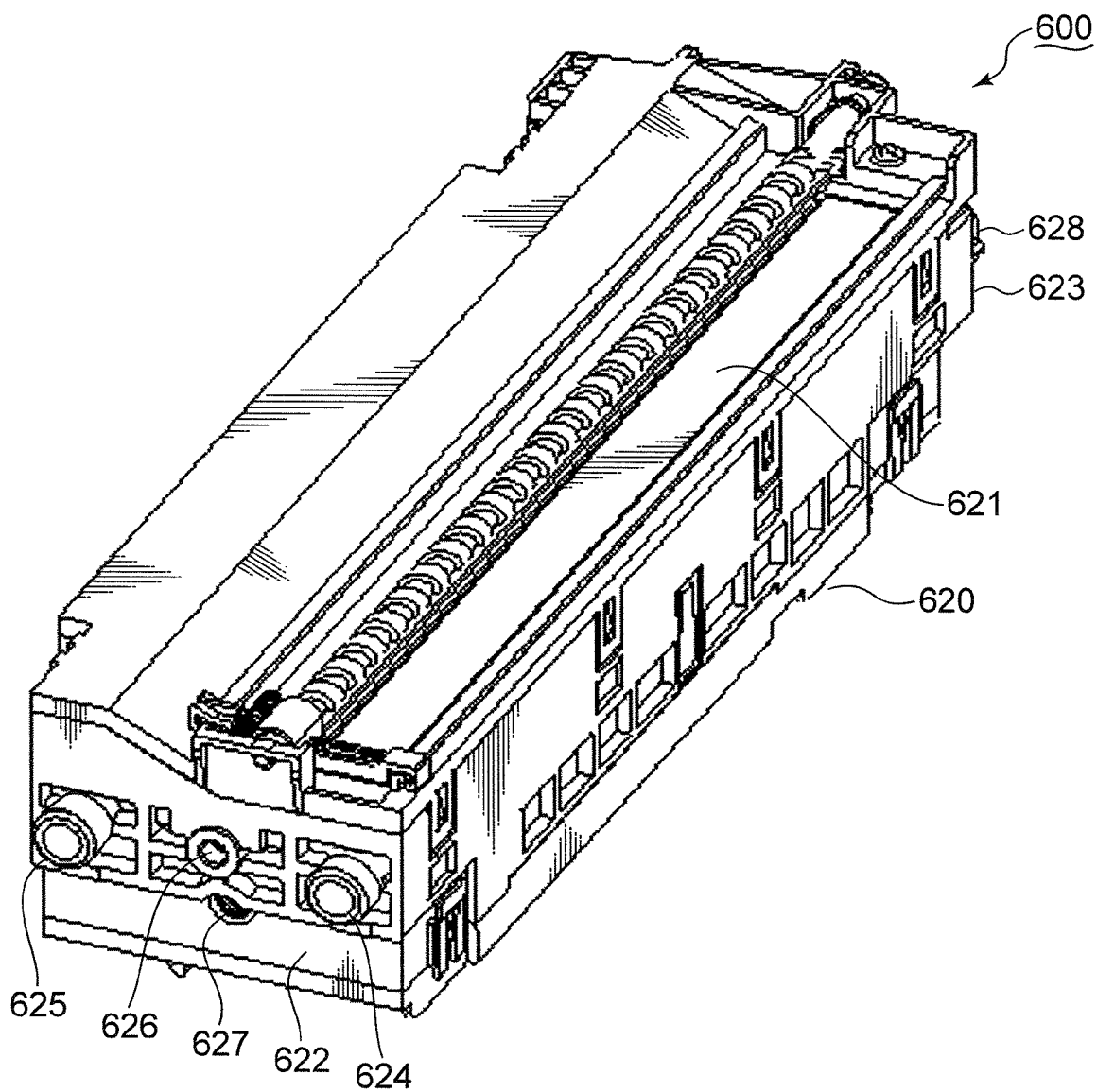
FIG. 5 is a schematic perspective view of one of the four exposure devices shown in FIG. 3.

FIG. 5 is a perspective view of appearance of one of the exposure devices 600. The exposure device 600 is described using FIGS. 3 to 5.

The housing 620 of the exposure device 600 includes the first wall 622 formed along the first support portion 611, and the second wall 623 formed along the second support portion 612. The first wall 622 has a substantially cylindrical first extension portion 624 and second extension portion 625 extending toward the first support portion 611. In the present embodiment, the first and second extension portions 624, 625 are exemplified as the extension portions extending from the housing 620 toward the support unit.

The first extension portion 624 is attached to the first notch 613, and the second extension portion 625 is attached to the second notch 614. An attachment hole 626 is formed between the first and second extension portions 624, 625. A user may screw a fixture (such as a screw or vis) into the attachment hole 626 through a hole 651 formed between the first upper edge surface 615 and the lower edge surface 619 of the main board 652 of the first support portion 611 to fix the housing 620 to the frame 610. The hole 651 is communicated to the adjustment hole 641. A communication hole 627 communicated to an internal space of the housing 620 is formed below the attachment hole 626. As described above, the user may insert a tip of a tool into the housing 620 through the adjustment hole 641 and the communication hole 627 to adjust the angular settings on the optical element stored in the housing 620.

Figure 6:
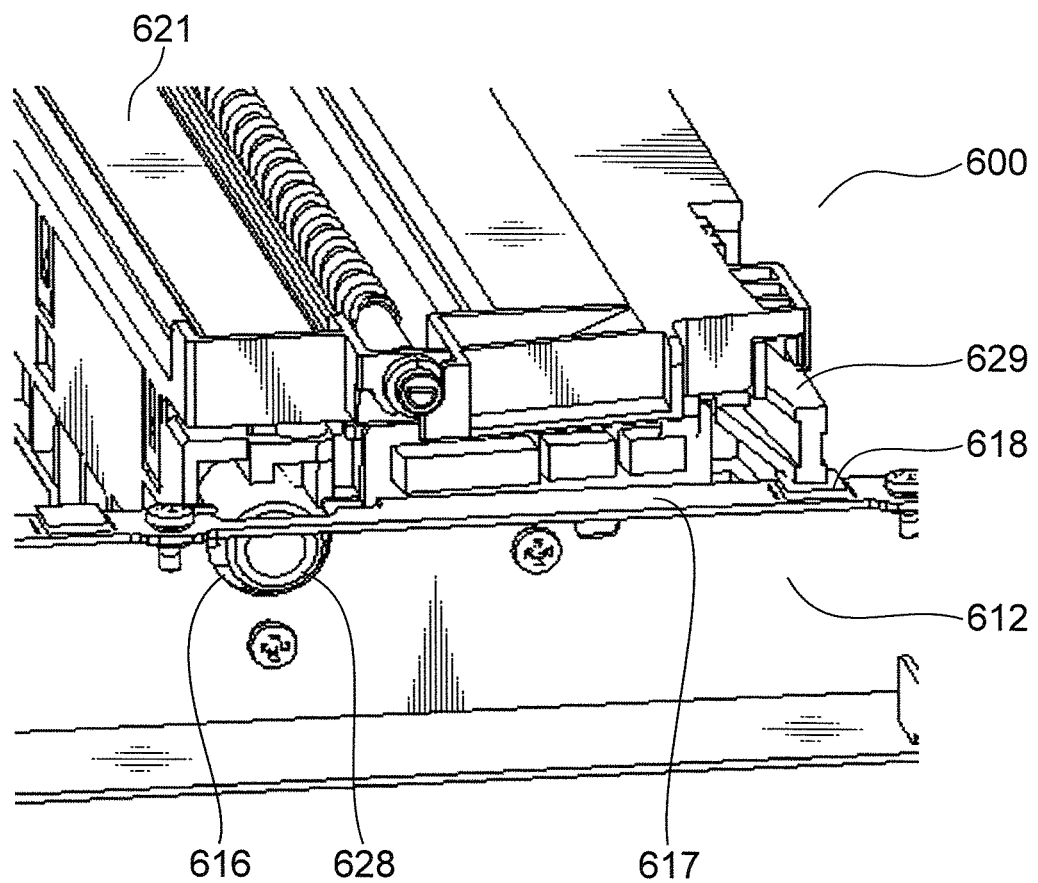
FIG. 6 is a schematic perspective view showing connection between the exposure device shown in FIG. 5 and a second support portion of the frame shown in FIG. 4.

FIG. 6 is a perspective view showing a structure of a connection between the exposure device 600 and the second support portion 612. The connection between the exposure device 600 and the second support portion 612 is described using FIGS. 4 to 6.

The second wall 623 of the exposure device 600 includes a third extension portion 628 extending toward the second support portion 612. The substantially cylindrical third extension portion 628 is positioned opposite to the first extension portion 624 and attached to the third notch 616 formed in the second support portion 612. The second wall 623 includes a fourth extension portion 629 extending toward the second support portion 612. The fourth extension portion 629 is positioned substantially opposite to the second extension portion 625. The fourth extension portion 629 extends along the second upper edge surface 617 of the second support portion 612.

Figure 7:
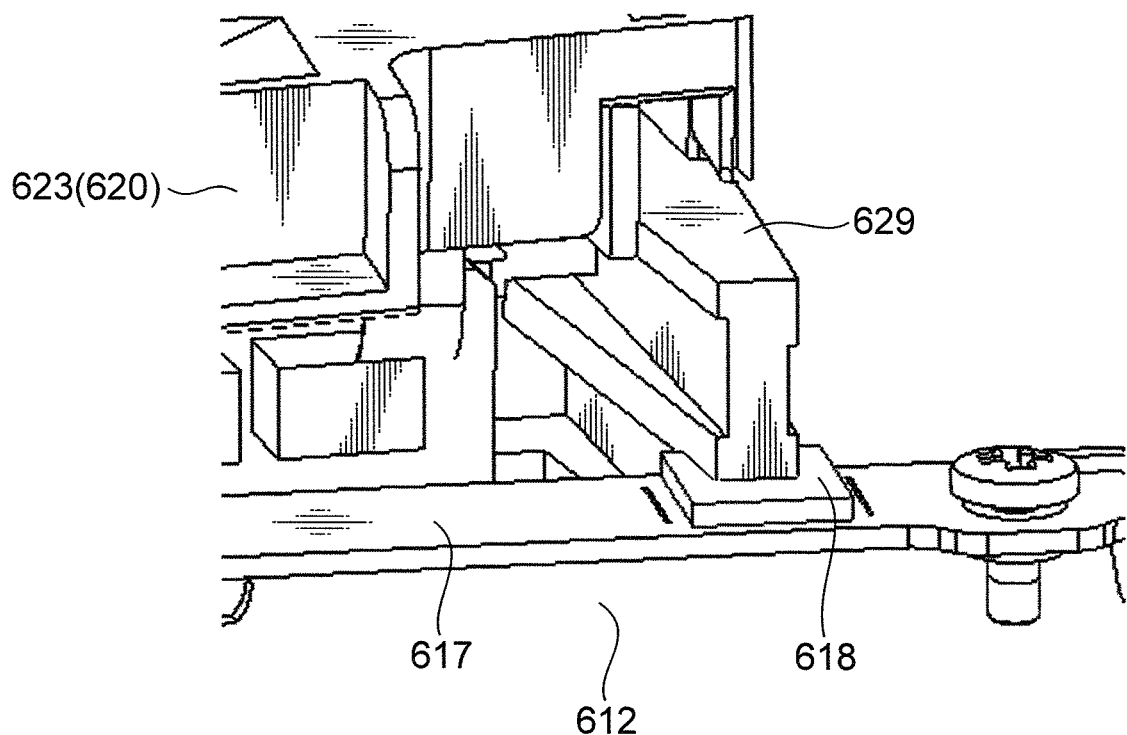
FIG. 7 is a schematic enlarged perspective view showing connection between a fourth extension portion and the second support portion shown in FIG. 6.

FIG. 7 is an enlarged perspective view of the fourth extension portion 629. A connection between the fourth extension portion 629 and the second support portion 612 is described using FIGS. 5 to 7.

As described above, the absorber 618 is placed on the second upper edge surface 617 of the second support portion 612. The fourth extension portion 629 is mounted on the absorber 618. A piece of a rubber plate is appropriately used as the absorber 618. The first and third extension portions 624, 628 are aligned with each other. The first wall 622, on which the first and second extension portions 624, 625 are formed, perpendicularly crosses a straight line connecting the first and third extension portions 624, 628. Therefore, lines connecting base ends of the first, second and third extension portions 624, 625 and 628 profile a substantially right triangle. The line connecting the base ends of the second and third extension portions 625, 628 profiles a hypotenuse of the right triangle and is longer than the line connecting the base ends of the first and third extension portions 624, 628. Only the connection of the first, second and third extension portions 624, 625 and 628 to the first, second and third notch 613, 614 and 616 results in a rotational moment around the line connecting the base ends of the second and third extension portions 625, 628. Because the second support portion 612 supporting the fourth extension portion 629 via the absorber 618 acts against rotation caused by the rotational moment around the line connecting the base ends of the second and third extension portions 625 and 628, the frame 610 may stably support the housing 620 (the exposure device 600). In addition, the absorber 618 is pressed between the second upper edge surface 617 of the second support portion 612 and the lower surface of the fourth extension portion 629 to a degree that the absorber 618 is moderately compressed by the fourth extension portion 629. For this reason, the absorber 618 may advantageously and appropriately absorb vibration without separating from the housing 620.

Figure 8:
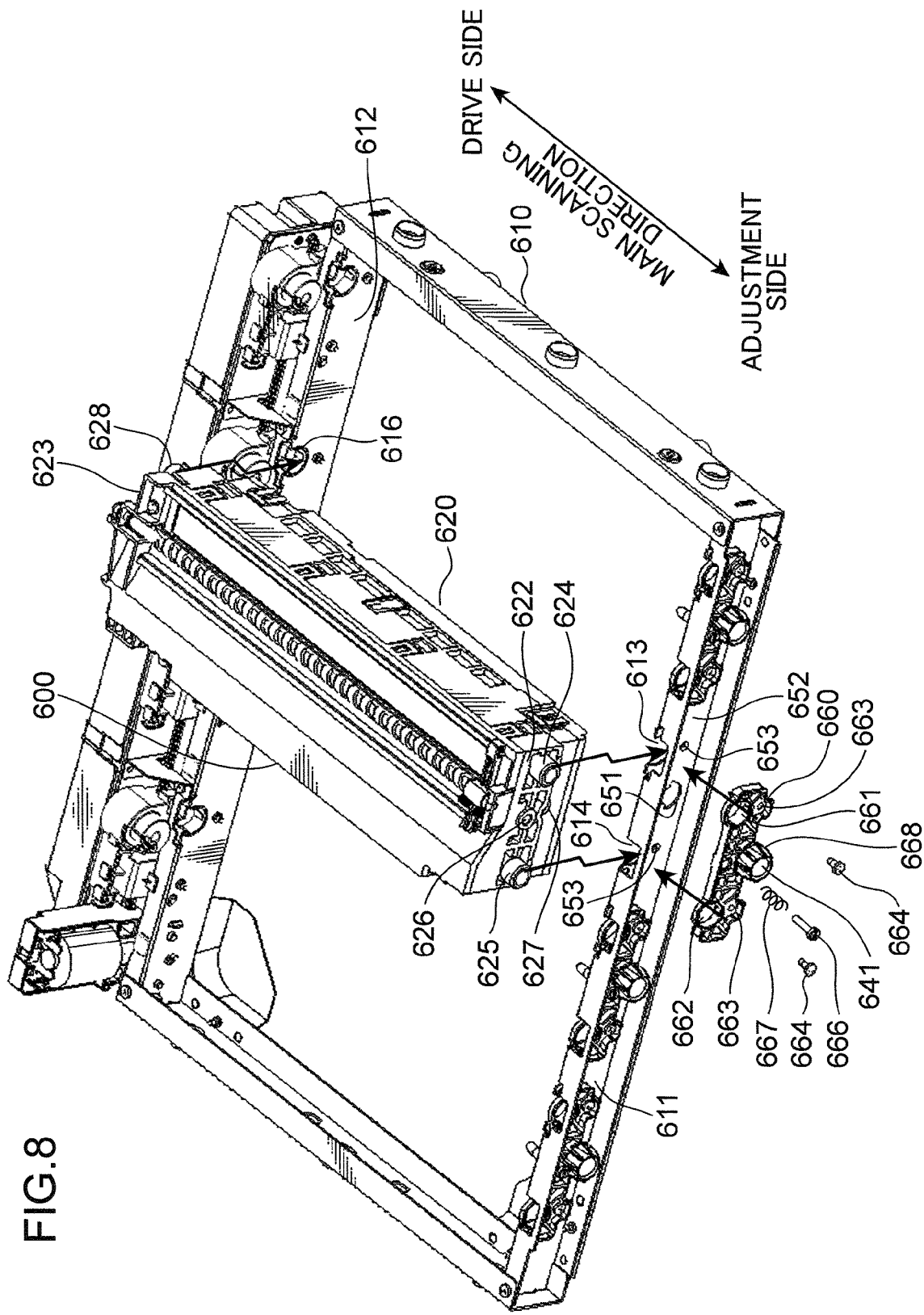
FIG. 8 is an exploded perspective view showing attachment of the exposure device to the frame shown in FIG. 4.
Figure 9:
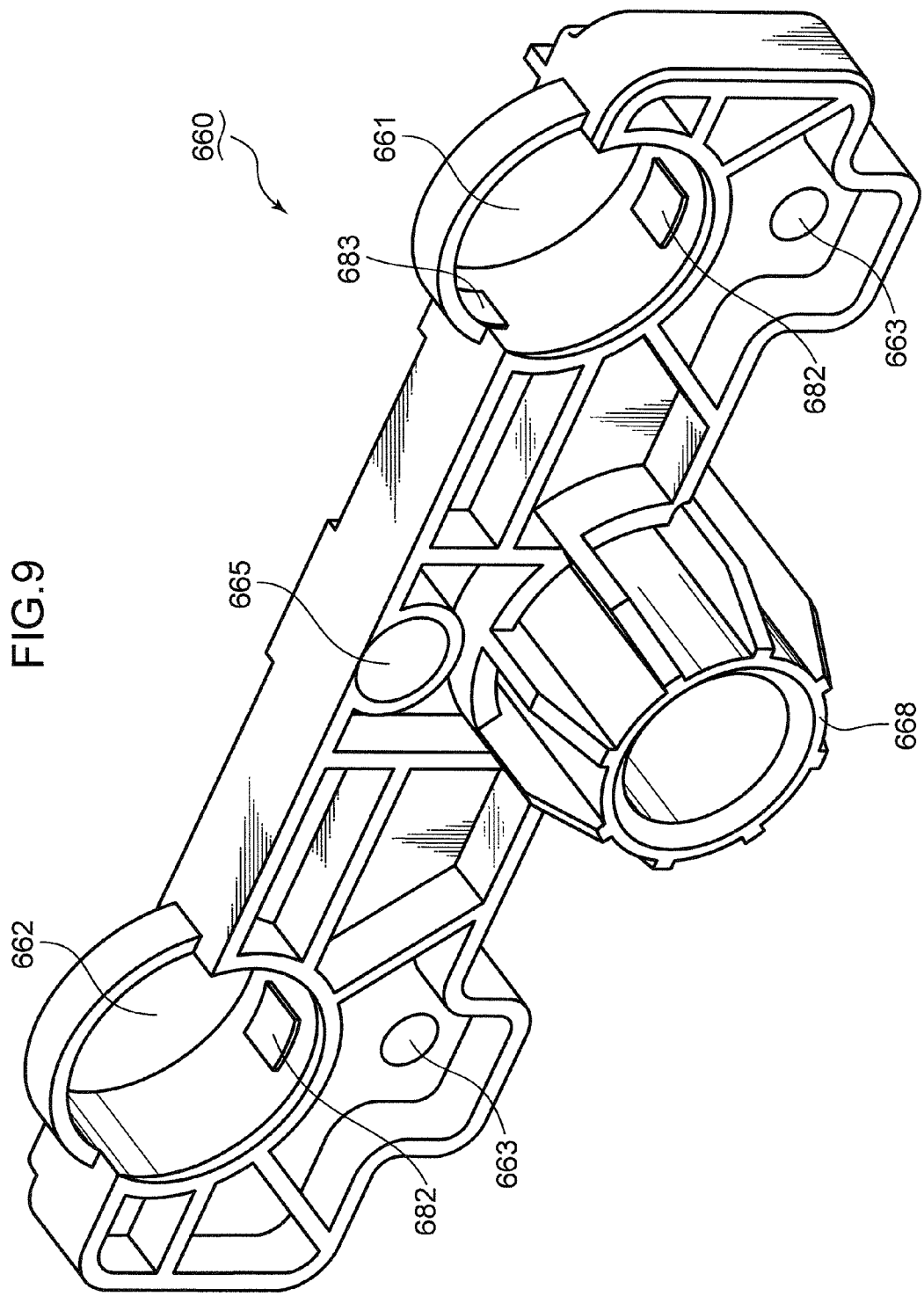
FIG. 9 is a schematic perspective view of a fixation piece used for attaching the exposure device to the frame shown in FIG. 4.
Figure 10:
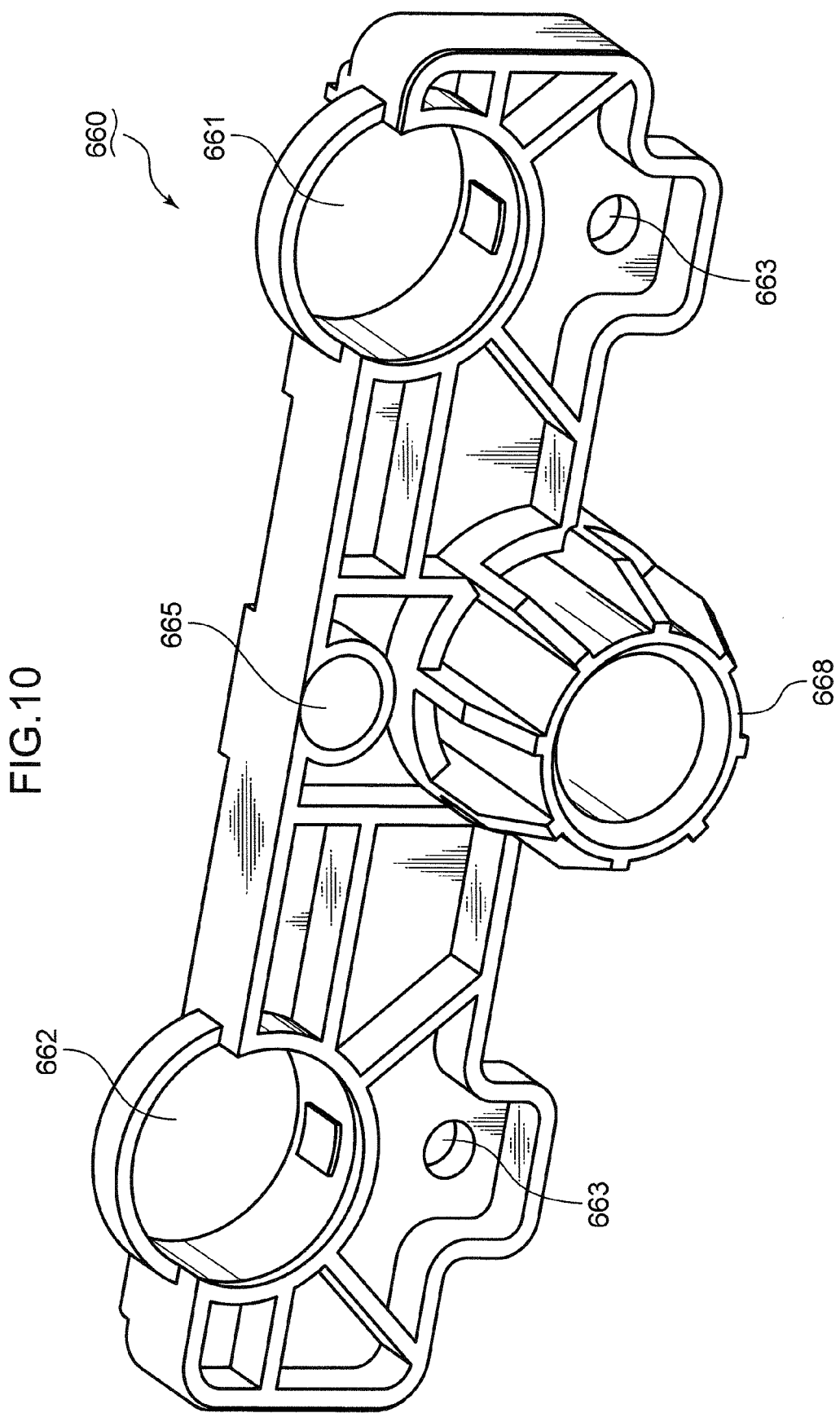
FIG. 10 is a schematic perspective view of the fixation piece used for attaching the exposure device to the frame shown in FIG. 4.

FIG. 8 shows connection of the exposure device 600 to the frame 610. FIGS. 9 and 10 are schematic perspective views of a fixation piece used for connecting the exposure device 600 to the frame 610, respectively. The connection of the exposure device 600 to the frame 610 is described using FIGS. 4 to 6 and FIGS. 8 to 10.

The exposure device 600 is inserted into the frame 610 from above. As a result, the first extension portion 624 is attached to the first notch 613 formed in the first support portion 611. The second extension portion 625 is attached to the second notch 614 formed in the first support portion 611. The third extension portion 628 is attached to the third notch 616 formed in the second support portion 612. Furthermore, the fourth extension portion 629 is mounted on the absorber 618, as described above.

The exposure 600 inserted into the frame 610 is fixed to the frame 610 by a substantially rectangular fixation piece 660. In the present embodiment, the fixation piece 660 is used as the support unit configured to support the housing 620 of the exposure device 600 along with the first support portion 611 of the frame 610. The fixation piece 660 profiles therein a first bore 661 complementary to the first extension portion 624 to be fitted therein, and a second bore 622 complementary to the second extension portion 625 to be fitted therein. In the present embodiment, the first and second bores 661, 662 are exemplified as openings into which the extension portions are inserted. A tip of the first extension portion 624 attached to the first notch 613 is inserted into the first bore 661. The second extension portion 625 attached to the second notch 614 is inserted into the second bore 662. A fixing hole 653 for fixing the fixation piece 660 is formed in the main board 652 of the first support portion 611. A through-hole 663 communicated with the fixing hole 653 is formed in the fixation piece 660. The fixation piece 660, into which the first and second extension portions 624, 625 are fitted, is fixed to the first support portion 611, by screwing a sub-fixture 664 such as a vis or a screw into the fixing hole 653 through the through-hole 663. Thus, it is less likely that the exposure device 600 vertically moves with respect to the frame 610.

The other through-hole 665 is formed in the substantially middle between the first bore 661 and the second bore 662. A fixture 666 (e.g., a screw or a vis) is inserted through the through-hole 665 and the substantially fan-shaped hole 651 of the main board 652, which is communicated to the through-hole 665. A tip of the fixture 666 is screwed into the attachment hole 626 formed on the first wall 622. Thus, the housing 620 and the fixation piece 660 are pressed and fixed to the first support portion 611. A coil spring 667 wound around the fixture 666 is disposed between a head of the fixture 666 and the fixation piece 660. The coil spring 667 biases the exposure device 600 toward the adjustment side.

An entire length of the housing 620 in the main scanning direction is preferably shorter than a distance between inner surfaces of the first and second support portions 611, 612 so that it is less likely that the housing 620 is subjected to excessive stress from the frame 610, even when the housing 620 expands in the main scanning direction due to heat generated by the driven optical elements in the housing 620. By using the coil spring 667 to bias the exposure device 600 toward the adjustment side as described above, the exposure device 600 is appropriately positioned in the main scanning direction, regardless of a difference between the entire length of the housing 620 in the main scanning direction and the distance between the inner surfaces of the first and second support portions 611, 612.

As a result of biasing the exposure device 600 toward the adjustment side, the second wall 623 of the housing 620 is slightly apart from the second support portion 612 of the frame 610. Accordingly, it is less likely that the vibration is transmitted from the second support portion 612 to the housing 620 of the exposure device 600.

The fixation piece 660 further includes a cylindrical projected tube 668 defining the abovementioned adjustment hole 641. As described above, the adjustment hole 641 is communicated to the hole 651 of the main board 652 and to the communication hole 627 formed in the first wall 622. Thus, a user may insert a dedicated tool into the adjustment hole 641 to adjust angles of the optical elements in the housing 620.

(Positioning the Housing, and Vibration-Proof Functions)

Figure 11:
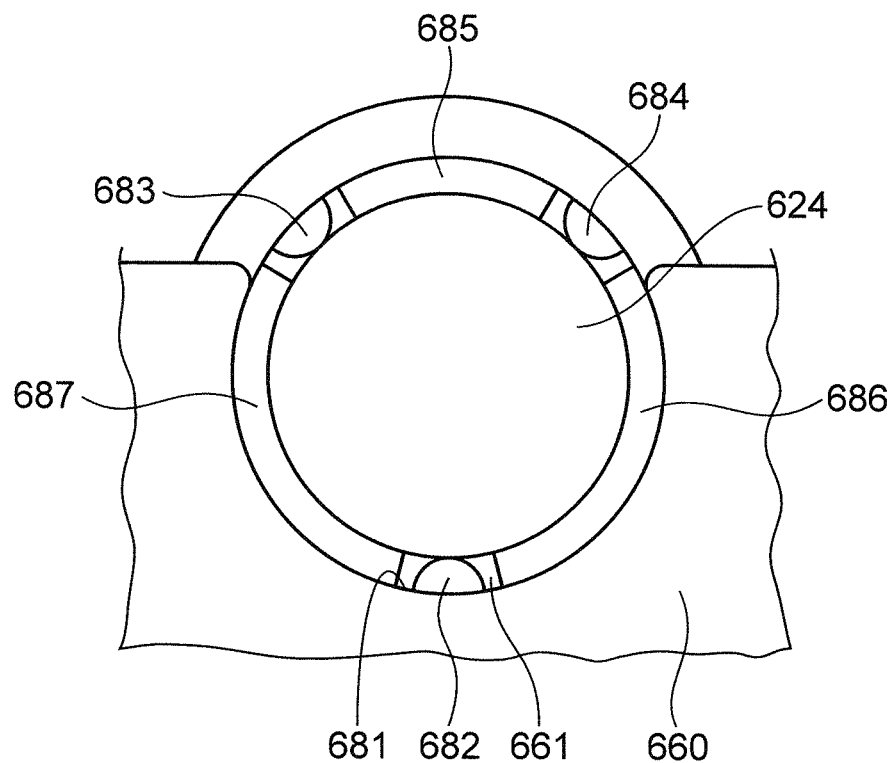
FIG. 11 is a schematic view showing a structure for positioning the exposure device with respect to the frame shown in FIG. 8 and for preventing transmission of vibration from the frame to the exposure device.

FIG. 11 is an enlarged view around the first bore 661 formed in the fixation piece 660. The fixation piece 660 is further described with FIGS. 8 to 11. The positioning and vibration-proof structure of the first bore 661 may be applied to the second bore 662 formed in the fixation piece 660 as well.

The fixation piece 660 includes a first surface 681 profiling the first bore 661. The first surface 681 confronts a circumferential surface of the first extension portion 624 inserted into the first bore 661. First, second and third protrusions 682, 683 and 684 protrude from the first surface 681 toward the center of the first bore 661. In the present embodiment, the first, second and third protrusions 682, 683 and 684 are exemplified as the positioning elements configured to position the housing 620 of the exposure device 600 with respect to the support unit (the frame 610 and/or the fixation piece 660). The first, second and third protrusions 682, 683 and 684 may be in a hemispherical shape as shown in FIG. 11, or in a rectangular shape as shown in FIGS. 9 and 10. Alternatively, the first, second and third protrusions 682, 683 and 684 may be in any shape as long as they may support the first or second extension portions 624, 625.

The first, second and third protrusions 682, 683 and 684 separate the circumferential surface of the first extension portion 624 from the first surface 681 and determine the position of the first extension portion 624 in the first bore 661 so that the first extension portion 624 becomes coaxial with the first bore 661. As described above, because the protruding structures (the first, second and third protrusions 682, 683 and 684) provided in the first bore 661 may be applied to the second bore 662 as well, the housing 620 of the exposure device 600 is appropriately positioned with respect to the frame 610 and/or the fixation piece 660.

The first, second and third protrusions 682, 683 and 684 are preferably disposed at regular intervals along the first surface 681. Alternatively, there may be another arrangement among the first, second and third protrusions 682, 683 and 684 if the first extension portion 624 is appropriately positioned in the first bore 661.

In the present embodiment, the first, second and third protrusions 682, 683 and 684 protrude integrally from the first surface 681. Alternatively, the first, second and third protrusions 682, 683 and 684 may integrally protrude from the circumferential surface of the first extension portion 624. Optionally, the first, second and third protrusions 682, 683 and 684 which are separate from the first surface 681 and/or the circumferential surface of the first extension portion 624 may be disposed between the first surface 681 and the circumferential surface of the first extension portion 624.

In the present embodiment, the three protrusions (the first, second and third protrusions 682, 683 and 684) are used for positioning the first extension portion 624. Alternatively, one or two protruding parts or four or more protrusions may be used for positioning the first extension portion 624. A number of protrusions used for positioning the first extension portion 624 may be determined according to a shape of the cross section of the first extension portion 624 (e.g., a rectangular, triangular or polygonal cross section).

In the present embodiment, the first, second and third protrusions 682, 683 and 684 are molded using resin, as with the fixation piece 660. Alternatively, the first, second and third protrusions 682, 683 and 684 may be made of other materials which are hard enough to appropriately position the first extension portion 624.

In the present embodiment, the first, second and third protrusions 682, 683 and 684 may be used for preventing a direct contact between the first wall 622 and the first support portion 611 of the exposure device 600 biased toward the adjustment side (see FIG. 8). For example, the base end of the first extension portion 624 may include a projection which comes into contact with at least one of the first, second and third protrusions 682, 683 and 684. The contact between the projection formed in the base end of the first extension portion 624 and the protrusion protruding from the first surface 681 (at least one of the first, second and third protrusions 682, 683 and 684) may prevent the housing 620 from being excessively displaced toward the adjustment side. As a result, the first wall 622 is kept in a position slightly away from the first support portion 611. Accordingly, the housing configured to store the optical elements therein is appropriately positioned with respect to the support unit. In addition, since the extension portion is separated from the first surface, a direct contact portion between the support unit and the extension portion may decrease. As a result, it is less likely that the vibration is transmitted from the support unit to the housing.

A first vibration-proof member 685 opposite to the first protrusion 682 is disposed between the first surface 681 and the circumferential surface of the first extension portion 624. A second vibration-proof member 686 opposite to the second protrusion 683 is disposed between the first surface 681 and the circumferential surface of the first extension portion 624. A third vibration-proof member 687 opposite to the third protrusion 684 is disposed between the first surface 681 and the circumferential surface of the first extension portion 624. In the present embodiment, the first, second and third vibration-proof members 685, 686 and 687 are exemplified as the vibration-proof elements configured to proof vibrational transmission from the support unit (the frame 610 and/or the fixation piece 660 in the present embodiment) toward the housing 620 of the exposure device 600. The vibration-proof elements opposite to the positioning elements suitably absorb vibrational components transmitted from the positioning elements to the housing, thereby the optical element stored in the housing becomes less sensitive to the vibration.

The first, second and third vibration-proof members 685, 686 and 687 come into contact with the first surface 681 and the circumferential surface of the first extension portion 624. The first vibration-proof member 685 mainly absorbs vibration transmitted from the first protrusion 682 to the first extension portion 624. The second vibration-proof member 686 mainly absorbs vibration transmitted from the second protrusion 683 to the first extension portion 624. The third vibration-proof member 687 mainly absorbs vibration transmitted from the third protrusion 684 to the first extension portion 624. The first, second and third vibration-proof members 685, 686 and 687 suitably reduces the vibrational components transmitted from interfaces between the first surface 681 and the first, second and third vibration-proof members 685, 686 and 687 toward the first extension portion 624. As a result, the first, second and third vibration-proof members 685, 686 and 687 may suitably absorb vibration, which is caused by operation of the other facilities (e.g., the photoreceptor drums 17, the developing devices 10Y, 10M, 10C, 10Bk or the conveyance roller pairs 360, which are described in the context of FIG. 2) and transmitted to the frame 610 and the fixation piece 660. Moreover, a contact area between the first extension portion 624 and the first surface 681 of the fixation piece 660 is limited to an extent to be required to position the first extension portion 624 in the first bore 661. Therefore, it is less likely that the vibration transmitted to the frame 610 and the fixation piece 660 reaches the first extension portion 624. Consequently, the exposure device 600 may be suitably positioned with respect to the frame 610 and/or the fixation piece 660, and it is less likely that the vibration is transmitted to the exposure device 600. As a result, the support structure that achieves a balance between the vibration-proof function and the positioning function is provided.

Both ends of the first vibration-proof member 685 are slightly separated from the second and third protrusions 683, 684, respectively. Both ends of the second vibration-proof member 686 are slightly separated from the first and third protrusions 682, 684, respectively. Both ends of the third vibration-proof member 687 are slightly separated from the first and second protrusion 682, 683, respectively. Thus, when the first support portion 611 is inserted into the first bore 661, it is less likely that the first, second and third vibration-proof members 685, 686 and 687, which are bonded to the first surface 681, are wedged between the circumferential surface of the first extension portion 624 and the protrusions (the first, second and third protrusions 682, 683 and 684).

In the present embodiment, the first, second and third vibration-proof members 685, 686 and 687 are bonded to the first surface 681. Alternatively, the first, second and third vibration-proof members 685, 686 and 687 may be bonded to the circumferential surface of the first extension portion 624. Optionally, the first, second and third vibration-proof members 685, 686 and 687 may be embedded in a gap defined between the first surface 681 and the first extension portion 624, after the first extension portion 624 is positioned in the first bore 661.

The first, second and third vibration-proof members 685, 686 and 687 are preferably formed from rubber pieces made of butyl rubber, which has high vibration-proof performance. Alternatively, the first, second and third vibration-proof members 685, 686 and 687 may be formed from other materials with vibration-proof characteristics.

This application is based on Japanese Patent application No. 2010-123209 filed in Japan Patent Office on May 28, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A support structure for supporting a housing configured to store an optical unit comprising:
   a support unit configured to support the housing and including a first surface that defines an opening;
   an extension portion extending from the housing toward the support unit and inserted into the opening,
   first, second and third protrusions protruding from said first surface,
   a first vibration-proof member opposite to the first protrusion,
   a second vibration-proof member opposite to the second protrusion, and
   a third vibration-proof member opposite to the third protrusion, wherein
   the first, second and third protrusions support and position the extension portion in the opening so that the extension portion is apart from the first surface, and
   the first, second and third vibration-proof members are disposed between the first surface and the extension portion.

2. The support structure according to claim 1, wherein the first, second and third protrusions are disposed at regular intervals along the first surface.

3. An image forming apparatus for forming an image using toner comprising:
   an exposure device configured to radiate a laser beam;
   an image bearer configured to bear an electrostatic latent image formed by the laser beam from the exposure device;
   a developing device configured to supply the toner to the image bearer to develop a toner image; and
   a support unit configured to support the exposure device and including a first surface that defines an opening,
   first, second and third protrusions protruding from said first surface,
   a first vibration-proof member opposite to the first protrusion,
   a second vibration-proof member opposite to the second protrusion, and
   a third vibration-proof member opposite to the third protrusion, wherein
   the exposure device includes:
   a housing configured to store an optical element for defining an optical path of the laser beam; and
   an extension portion extending from the housing toward the support unit and inserted into the opening,
   the first, second and third protrusions supports and positions the extension portion in the opening so that the extension portion is apart from the first surface, and
   the first, second and third vibration-proof members are disposed between the first surface and the extension portion.

4. The support structure according to claim 1, wherein
   the first vibration-proof member is disposed and configured to absorb vibration from the first protrusion,
   the second vibration-proof member is disposed and configured to absorb vibration from the second protrusion, and
   the third vibration-proof member is disposed and configured to absorb vibration from the third protrusion.

5. The support structure according to claim 4, wherein the first, second and third protrusions are disposed to propagate vibrations in different directions from each other.

* * * * *